(12) United States Patent
Glingener et al.

(10) Patent No.: US 6,947,421 B1
(45) Date of Patent: Sep. 20, 2005

(54) SYSTEM METHOD FOR THE AUTOMATIC ROUTING OF DATA PACKETS IN AN OPTICAL DATA PACKET STREAM

(75) Inventors: Christoph Glingener, Feldkirchen-Westerham (DE); Harald Geiger, Neuried (DE); Erich Gottwald, Holzkirchen (DE)

(73) Assignee: Siemens Aktiengesellschaft, Munich (DE)

(*) Notice: Subject to any disclaimer, the term of this patent is extended or adjusted under 35 U.S.C. 154(b) by 668 days.

(21) Appl. No.: 09/645,306

(22) Filed: Aug. 25, 2000

(30) Foreign Application Priority Data

Aug. 26, 1999 (DE) ................................ 199 40 565

(51) Int. Cl.[7] ............................................. H04L 12/28
(52) U.S. Cl. ........................ 370/392; 370/389; 398/45; 398/46; 398/47; 398/51; 398/53; 398/54; 398/74; 398/75; 398/79
(58) Field of Search ................................ 370/392, 389; 398/51, 54, 79, 45, 46, 47, 53, 74, 75

(56) References Cited

U.S. PATENT DOCUMENTS

| | | | | |
|---|---|---|---|---|
| 4,845,702 A | * | 7/1989 | Melindo | 398/54 |
| 4,894,818 A | * | 1/1990 | Fujioka et al. | 398/51 |
| 4,939,721 A | * | 7/1990 | De Bosio | 370/392 |
| 4,970,717 A | * | 11/1990 | Haas | 370/249 |
| 5,278,689 A | * | 1/1994 | Gitlin et al. | 398/54 |
| 5,488,501 A | * | 1/1996 | Barnsley | 398/51 |
| 5,541,756 A | * | 7/1996 | Chang-Hasnain et al. | 398/51 |
| 5,912,753 A | * | 6/1999 | Cotter et al. | 398/54 |
| 5,917,179 A | * | 6/1999 | Yao | 250/227.11 |
| 5,982,516 A | * | 11/1999 | Murphy et al. | 398/51 |
| 6,111,673 A | * | 8/2000 | Chang et al. | 398/79 |
| 6,559,991 B1 | * | 5/2003 | Farley et al. | 398/152 |

FOREIGN PATENT DOCUMENTS

| | | |
|---|---|---|
| EP | 0 491 495 A1 | 6/1992 |
| EP | 0 639 015 A2 | 2/1995 |

* cited by examiner

Primary Examiner—Steven Nguyen
Assistant Examiner—Clemence Han
(74) Attorney, Agent, or Firm—Morrison & Foerster LLP

(57) ABSTRACT

At the transmitter end, route information is converted to allocated frequency mixes that are used to produce route signals by modulating a carrier signal. The route signals produced are placed in front of and/or after at least one data packet and are transmitted within an optical data packet stream. At the receiver end, the route information is evaluated in terms of the frequency mix used for the modulation and the data packets are switched using the route information obtained from the frequency mixes.

12 Claims, 3 Drawing Sheets

SYSTEM METHOD FOR THE AUTOMATIC ROUTING OF DATA PACKETS IN AN OPTICAL DATA PACKET STREAM

This application is based on German priority application 19940565.4, which is hereby incorporated in its entirety by reference.

FIELD OF THE INVENTION

The invention relates to a method for the automatic routing of data packets in an optical data packet stream and to an optical transmission system having automatic routing for data packets that are each separated by a time interval containing no data.

BACKGROUND OF THE INVENTION

It is likely that packet-oriented data traffic will increase exponentially in the next few years, driven by Internet applications, whereas the market for landline network-connected telephony will continue to grow slowly. This means that an increased demand for, by way of example, methods for the automatic routing of optical data packets in the field of optical packet processing is foreseeable for the near future.

In existing and future optical transmission systems, and particularly in transmission systems using Wavelength Division Multiplexing ("WDM"), data is transmitted in the form of data packets using an optical signal. The data packets may comprise various signal types and signal formats, and, specifically when WDM is used, may be allocated to the individual data packets of a plurality of transmission channels. The signal types and signal formats can differ both in terms of the protocol used and/or of the data transmission rates used. Examples of these include Asynchronous Transfer Mode, Internet Protocol ("IP") and Gigabit Ethernet.

In order to make the best use of the transmission bandwidth available for optical transmission, it is particularly desirable to be able to use an optical data packet stream to transmit a plurality of different signal types and to forward them on a connection-specific basis. To this end, optical transmission systems produced to date usually use a continuous, packet-oriented signal structure that also supports the optical transparency of the optical transmission system. Furthermore, particular requirements of the use of such a signal structure include that the packet-oriented signal structure used is compatible with existing optical transmission systems and transmission equipment, and that the data packets can be forwarded on a connection-specific basis in the respective optical transmission equipment.

To perform automatic routing of optical data packets in transmission systems produced to date, the optical data packet is first optoelectrically converted in optical switching equipment and the electrical data packet header is then used to ascertain the route information associated with the respective data packet. The ascertained route information is used to switch either the data packet represented by an electrical data signal or the electro-optically converted data packet represented by an optical data signal. This presupposes opto-electro-optical conversion of the optical data signal or of the optical data packet stream in the optical transmission equipment in which the data packets are switched.

In addition, purely optical packet switching systems are known in which, by contrast with data systems produced to date, optical data packets are switched exclusively by optical transmission equipment. In this context, the optical data packet has an optical data packet header that is optically processed by the respective optical switching equipment on a bit-by-bit basis. The switching information obtained from the optical data packet header using an enormous amount of technical complexity is used to switch the associated optical data packet in the switching equipment. However, particularly on account of the high transmission rates in the gigahertz range that are customary for optical transmission systems, the implementation of purely optical automatic routing methods of this type requires a considerable level of optical circuit complexity and a high level of optical memory complexity, which causes considerable implementation difficulties in practice.

SUMMARY OF THE INVENTION

The embodiment of the invention is to improve the optical automatic routing of data packets in an optical data packet stream. This can be achieved by having route information converted to allocated frequency mixes at the transmitter end, producing route signals by modulating a carrier signal with the frequency signals and placing the route signals in front of and/or after the data packets and transmitting the data packet.

An aspect of the method according to the invention is that route information is converted to allocated frequency mixes at the transmitter end and route signals are produced by modulating a carrier signal with these frequency mixes. The route signals produced are then placed in front of and/or after at least one data packet and the data packets, including the preceding and succeeding route signals, are transmitted. At the receiver end, the route signals are evaluated in terms of the frequency mix used for the modulation, and the data packets are switched using the route information obtained from the frequency mixes.

According to an aspect of the invention, the route information available at the transmitter end for routing the respective data packets is converted to allocated frequency mixes that are advantageously used for modulating a defined carrier signal to produce a route signal. According to the invention, the route signal produced is placed in front of and/or after a respective at least one optical data packet in a transmission unit, and the optical data packet, including the preceding and/or succeeding route signals, is transmitted to a reception unit via an optical transmission link.

Advantageously, various signal types, such as SDH data packets or IP data packets, may be packed into the data packets or "data containers" in the optical data packet stream, their route information previously being read from the electrical data packet header (which is realized differently from signal type to signal type) and being used in a form converted to a frequency mix in order to produce optical route signals preceding and/or succeeding the different signal types' or signal formats' data packed into the optical data packets. Thus, the different signal types' data packeted into the optical data packets can advantageously be switched or routed exclusively on the basis of the route information recovered by evaluation of the route signals preceding and succeeding the optical data packets at the receiver end. Hence, individual optical data packets are switched in the reception unit and switching equipment without any need for the entire optical data packet to be optoelectrically converted and electrically evaluated first. Advantageously, only the route signals preceding and/or succeeding the optical data packet are evaluated in terms of the frequency mixes used for modulating the carrier signal and are routed using the route information associated with the respective frequency mix. Such evaluation of the preceding and/or succeeding route signals is implemented with a low level of circuit complexity, which saves using an optical reception unit with clock recovery and dispenses with the need for complex evaluation logic.

In another aspect of the invention, the route information is converted to route signals by amplitude modulation or by phase modulation of a carrier signal with a frequency mix. Advantageously, neither amplitude modulation nor phase modulation of a carrier signal with a frequency mix requires a high level of circuit complexity either in the transmission unit or in the reception unit. Recovery of the frequency mix from the transmitted route signal in the reception unit and switching equipment when using amplitude modulation is particularly economical and reliable to implement in terms of circuitry.

In still another aspect of the invention, the carrier frequency selected for the route signals is the data transmission rate (or half the data transmission rate), and that audio-frequency modulation frequencies are used for modulating the route signal. The invention's selection of the data transmission rate (or half the data transmission rate) as the carrier frequency serves to save data transmission resources within the data packet to be transmitted. That is, only a few overhead bits are required for clock regeneration for the data signal transmitted in the optical data packet, and the saved data transmission capacity (the saved overhead bits) is freely disposable. In particular, the freely disposable bits can be used to transmit additional data. Such selection of the carrier signal frequency is irrelevant for the automatic routing of the optical data packet. This means that the carrier signal required for the automatic routing according to the invention can have an arbitrary frequency, as long as the subsidiary condition (modulation frequencies are lower than the selected carrier frequency) is satisfied. This condition is satisfied by using audio-frequency modulation frequencies to produce the route signal. In addition, using audio-frequency modulation frequencies considerably simplifies evaluation of the route signal in terms of the frequency mix or the route information contained therein and allows for extremely reliable detection of the different route information.

According to another aspect of the invention, a connection is terminated using the route signal succeeding at least one data packet. Hence, the duration of a data packet or a plurality of data packets in a connection is not restricted in any way. That is, a plurality of data packets in a connection can be forwarded or routed to the same output of the optical switching equipment in direct succession to one another without a route signal being placed in front of the data packets which follow the first data packet, since the connection is terminated only by the single route signal succeeding the last data packet of the data packets in this connection that are transmitted in direct succession to one another.

In another embodiment of the invention, an optical transmission system has automatic routing for data packets that are each separated by a time interval containing no data. The embodiment includes, for example, a transmission unit and a reception unit, a conversion unit at the transmitter end for converting route information for at least one data packet to route signals produced by modulating a carrier signal with a frequency mix and for adding the route signals at least one of in front of and after the data packet, a transmission device for transmitting the data packet, including the route signals, an evaluation unit at the receiver end for detecting and evaluating the route signals, and a switching unit for switching through the data packet using the route information ascertained by evaluating the route signals.

In one aspect of the invention, the optical transmission includes a synchronization unit that uses the carrier signal of one of the route signals for the purpose of clock synchronization.

In another aspect of the invention, the optical delay element is arranged between the optical splitter and the switching unit.

BRIEF DESCRIPTION OF THE DRAWINGS

The invention is explained in more detail below with reference to the following figures.

DETAILED DESCRIPTION OF THE INVENTION

Figure 1:
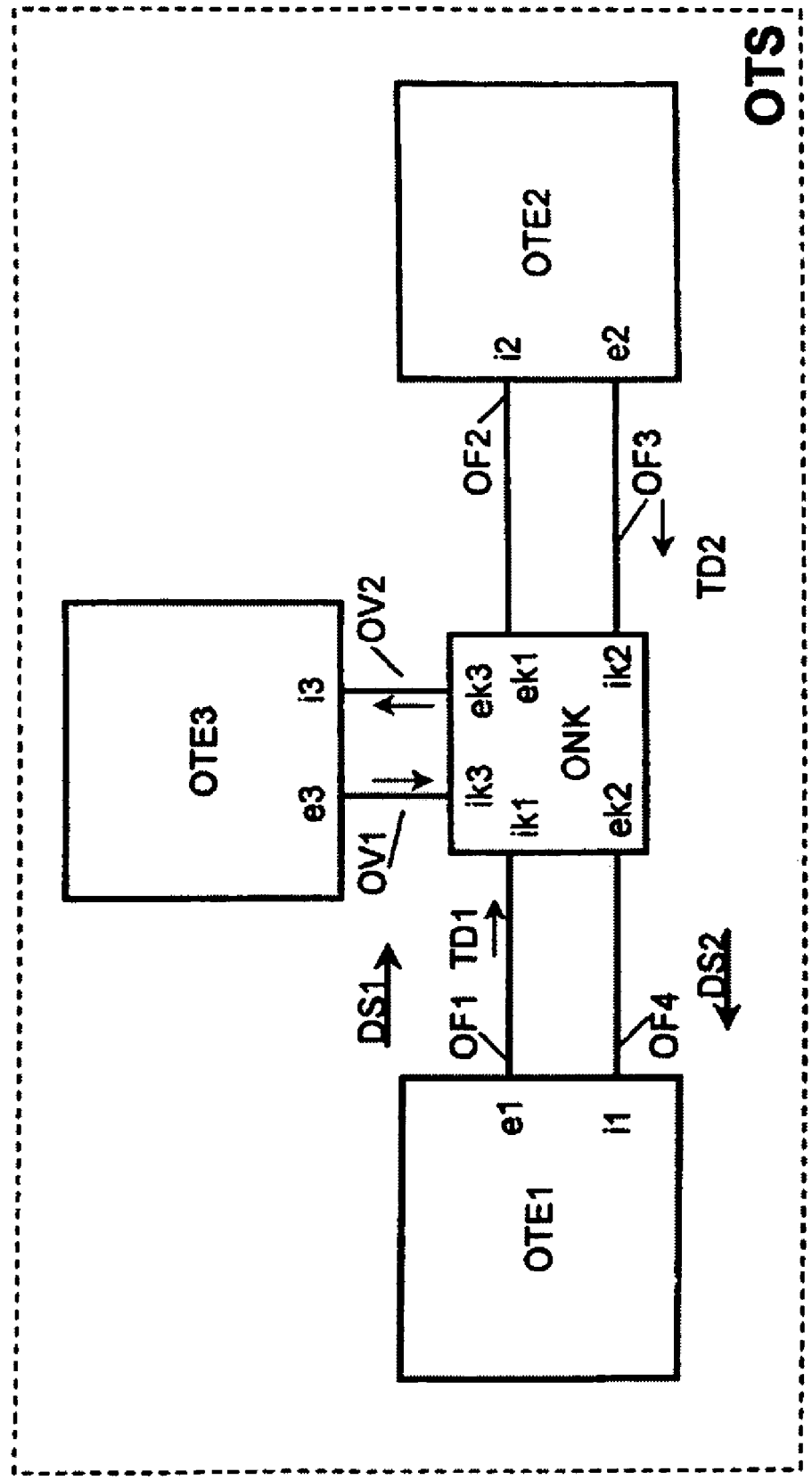
FIG. 1 shows an exemplary block diagram of the schematic structure of an optical transmission system.

FIG. 1 shows an optical transmission system OTS having, by way of example, a first, a second and a third item of optical transmission equipment OTE1–OTE3, where, by way of example, the first item of optical transmission equipment OTE1 has a first input i1 and a first output e1, the second item of optical transmission equipment OTE2 has a second input i2 and a second output e2, and the third item of optical transmission equipment OTE3 has a third input i3 and a third output e3. The optical transmission equipment OTS is provided with an optical network node ONK that has, by way of example, a first, a second and a third node input ik1, ik2, ik3, respectively, and also a first, a second and a third node output ek1, ek2, ek3, respectively. The first output e1 of the first item of optical transmission equipment OTE1 is connected to the first node input ik1 of the optical network node ONK via a first optical fiber OF1, and the first node output ek1 is connected to the second input i2 of the second item of optical transmission equipment OTE2 via a second optical fiber OF2. Similarly, the second output e2 of the second item of optical transmission equipment OTE2 is connected to the second node input ik2 of the optical network node ONK via a third optical fiber OF3, and the second node output ek2 of the optical network node ONK is connected to the first input i1 of the first item of optical transmission equipment OTE1 via a fourth optical fiber OF4. The first and second items of optical transmission equipment OTE1, OTE2 are connected via the optical network node ONK for the optical transmission of data, with a first data stream DS1 preferably being provided in a first transmission direction TD1 for the optical transmission of data from the first item to the second item of optical transmission equipment OTE1, OTE2, and a second data stream DS2 preferably being provided in a second transmission direction TD2 for the optical transmission of data from the second item to the first item of optical transmission equipment OTE2, OTE1.

The third item of optical transmission equipment OTE3 is connected to the optical network node ONK via a first and second optical connecting fibers OV1, OV2, for example, for the purpose of feeding data into the first and/or into the second data stream DS1, DS2. The third node input ik3 and the third node output ek3 of the optical network node ONK are connected to the third output e3 and to the third input i3, respectively, of the third item of optical transmission equipment OTE3. This allows, by way of example, data present in the third item of optical transmission equipment OTE3 to be fed into the first or second data stream DS1, DS2 in the first or second transmission direction TD1, TD2 via the first and second connecting fibers OV1, OV2 and the optical network node ONK. Alternatively, data which is to be transmitted to the third item of optical transmission equipment OTE3 is allowed to be read from the first or second data stream DS1, DS2 and transmitted to the third item of optical transmission equipment OTE3.

Figure 2:
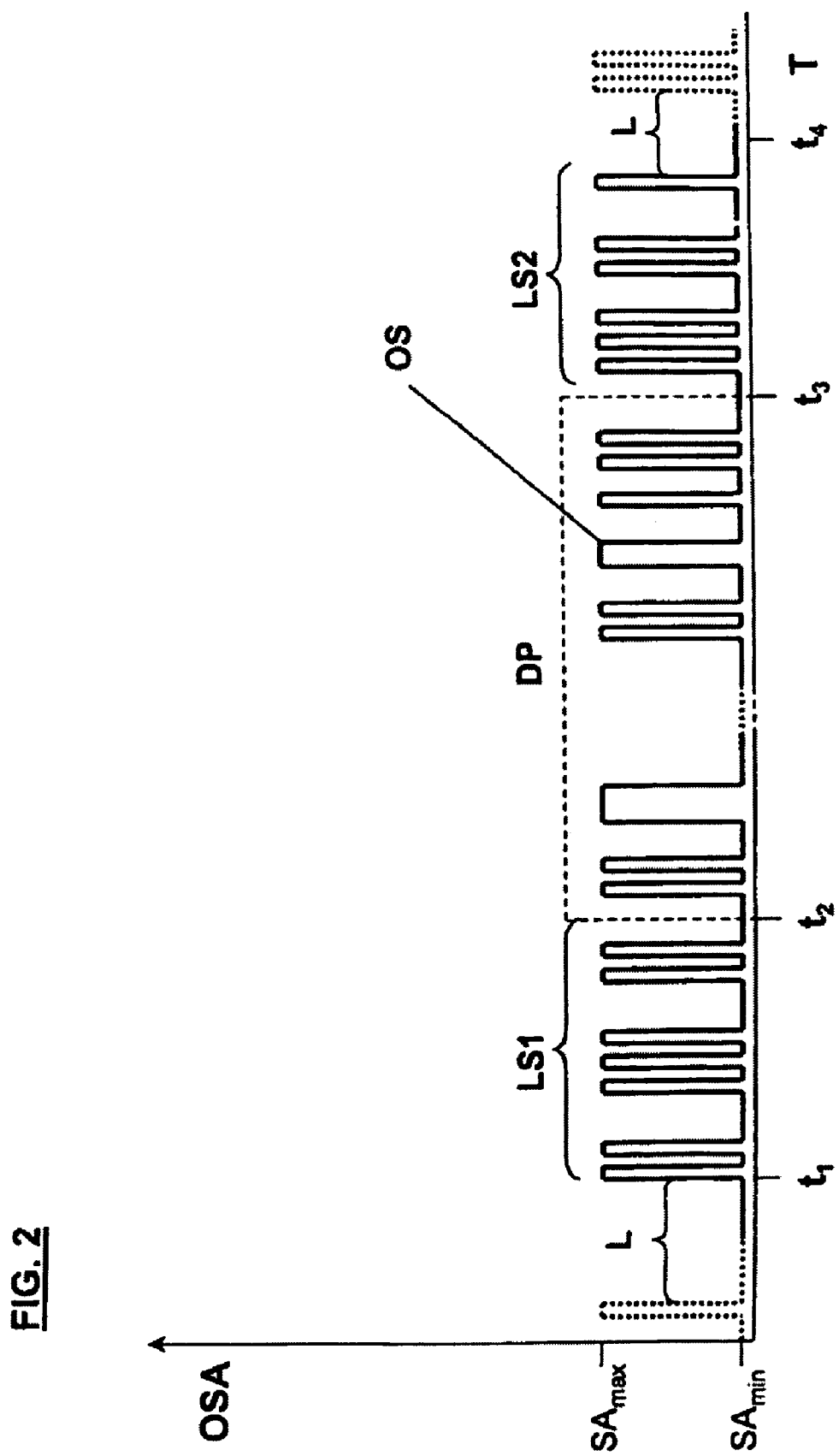
FIG. 2 shows an exemplary graph illustrating an optical data packet including the preceding and succeeding route signals.

As shown in FIG. 2, an optical data packet DP of the invention preferably includes preceding and succeeding route signals LS1, LS2. A plurality of data packets DP, including their respective preceding and succeeding route signals LS1, LS2 in the various connections, form the first and second data streams DS1, DS2 illustrated in FIG. 1. The graph of FIG. 2 has a horizontal axis T indicating the starting and ending times of the transmission of a data packet DP and of the preceding and succeeding route signals LS1, LS2. The graph further has a vertical axis OSA indicating the amplitude OSA of the optical signal OS and/or of the optical data to be transmitted. According to the invention, the first and second data streams DS1, DS2 have data packets DP including the preceding and succeeding route signals LS1, LS2. The data packets DP in the first and second data streams DS1, DS2 are separated by time intervals L that have a minimum length and contain no data. As shown in FIG. 2, in one embodiment of the invention, the first route signal LS1 precedes the data packet DP and the second route signal LS2 succeeds the data packet DP. Also in the illustrated embodiment, the amplitude OSA of the optical signal OS representing the data packet DP and the first and second route signals LS1, LS2 does not exceed a maximum signal amplitude value $SA_{max}$ and does not fall below a minimum signal amplitude value $SA_{min}$. The first route signal LS1 can be used, for example, to add to the data packet DP route information about the subsequent network nodes ONK and optical transmission equipment OTE1, OTE2, OTE3. Similarly, the second route signal LS2 can be used, for example, to indicate to the optical transmission equipment OTE1, OTE2, OTE3 and/or the optical network node ONK the end of a data packet DP or group of data packets DP in a connection.

With regard to the structure of the optical signal OS, as shown in FIG. 2, first to fourth times $t_1$-$t_4$, for example, mark the beginning and end of the transmission of a the data packet DP and of the first and second route signals LS1, LS2. After a time interval L in which no data is transmitted, transmission of the first route signal LS1 starts at the first instant $t_1$ and continues until the second instant $t_2$ when the first route signal LS1 has been fully transmitted. Also at the second instant $t_2$, transmission of the optical data packet DP starts and the transmission continues until the third instant $t_3$ when the optical data packet DP has been fully transmitted. Also at the third instant $t_3$, transmission of the second route signal LS2 starts and the transmission continues until the fourth instant $t_4$ when the second route signal LS2 has been fully transmitted. An additional time interval L, in which no data is transmitted, follows the transmission of the second route signal LS2.

The optical signal OS is illustrated in sections in FIG. 2 for purposes of example. Multiple optical data packets DP with respective preceding and succeeding route signals LS1, LS2, together representing the continuous first and second data streams DS1, DS2, are used for the optical transmission of data according to the invention. The time intervals L have a minimum duration which is less than one millisecond, preferably in the microsecond range. This allows economically beneficial, electronic circuits to be used, for example, to control the switching of the optical data packets DP, including the preceding and succeeding route signals LS1, LS2.

Figure 3:
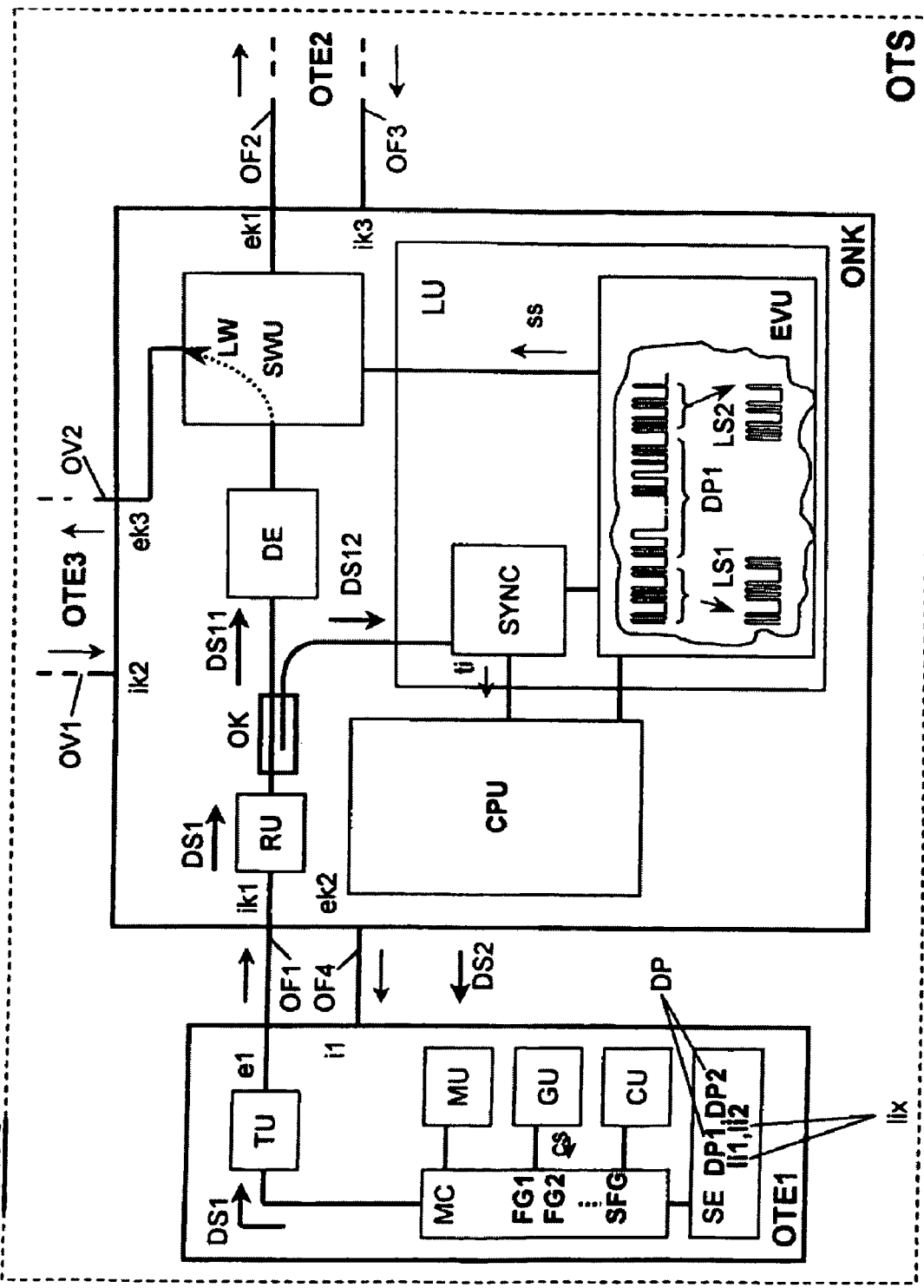
FIG. 3 shows an exemplary further block diagram of an optical transmission system with automatic routing for data packets.

As shown in greater detail in FIG. 3, the first item OTE1 is connected to the optical network node ONK. The first input i1 and the first output e1 are connected to the second output ek2 and the first input ik1, respectively, via the first and fourth optical fibers OF1, OF4, respectively. The first optical fiber OF1 is used to transmit a first data stream DS1 in a direction and the fourth optical fiber OF4 is used to transmit a second data stream DS2 in an opposite direction. The second input ik2 and the third output ek3 of the optical network node ONK are connected to the third item OTE3 by the first and second optical connecting fibers OV1, OV2. The third input ik3 and the first output ek1 of the optical network node ONK are connected to the second item OTE2 by the second and third optical fibers OF2, OF3.

The first item OTE1 includes, for example, a control unit MC. The first item OTE1 preferably further includes a transmission unit TU, a modulation unit MU, a generation unit GU, a memory unit SE and a conversion unit CU, all of which are connected to the control unit MC. The first output e1 is connected to the transmission unit TU. The memory unit SE stores respective data packets DP (e.g., DP1, DP2, etc.) and associated route information lix (e.g., li1, li2, etc.). The data packets DP and the route information lix can be read from the memory unit SE by the control unit MC as part of a read cycle.

The optical network node ONK includes, for example, a central processor unit CPU, a routing unit LU, a switching unit SWU, a reception unit RU and an optical delay element DE. The routing unit LU preferably includes a synchronization unit SYNC and an evaluation unit EVU. The first input ik1 is connected via the reception unit RU to an optical coupler OK that splits the transmitted optical signal OS (i.e., the first data stream DS1) into a first main data stream DS11 and a first subsidiary data stream DS12. The optical coupler OK is connected to the optical delay element DE and to the routing unit LU. The first main data stream DS11 is transmitted to the optical delay element DE and the first subsidiary data stream DS12 is transmitted to the routing unit LU. The switching unit SWU is connected to the first output ek1, the third output ek3, the optical delay element DE, and the routing unit LU (preferably to the evaluation unit EVU). The central processor unit CPU is connected both to the synchronization unit SYNC and the evaluation unit EVU. The synchronization unit SYNC is connected to the evaluation unit EVU.

During the operation of the illustrated embodiment, the generation unit GU of the first item OTE1 produces, under the control of the control unit MC, a carrier signal cs that has a defined carrier frequency, such as, for example, the data transmission rate or half the data transmission rate. The generation unit GU then transmits the carrier signal to the control unit MC. The control unit MC reads a data packet DP and its associated route information lix from the memory unit SE. For example, FIG. 3 shows first and second data packets DP1, DP2 and associated first and second route information li1, li2. The conversion unit CU is used to convert, for example, the first route information li1 in the first data packet DP1 to a first frequency mix FG1. The carrier signal cs is modulated with the first frequency mix FG1 by the modulation unit MU to produce a first route signal LS1. Additionally, for example, using a predefined standard frequency mix SFG, a second route signal LS2 is produced. The second route signal LS2 identifies the end of the first data packet DP1 (or, for example, the end of the last data packet DP of a plurality of data packets DP in a connection). The conversion and modulation of the carrier signal cs using the respective frequency mixes FG1, SFG are performed, for example, using amplitude or phase modulation, with the respective frequency mixes FG1, SFG primarily including audio frequencies. The first route signal LS1, once produced, is placed in front of the first data packet DP1 using the control unit SE. The second route signal LS2, once produced, is placed after the first data packet DP1. Similarly, each data packet DP available for transmission in the first item OTE1 is linked to its respective route information lix. The data packets DP are transmitted serially to the transmission unit TU in the first data stream DS1. The transmission unit TU transmits the first data packet DP1, including the preceding and succeeding first and second route signals LS1, LS2, to the reception unit RU through the first optical fiber OF1.

The optical signal OS received in the reception unit RU (e.g., the first data stream DS1) is split into the first main data stream DS11 and the first subsidiary data stream DS12 using the downstream optical coupler OK. The first main data stream DS11 is delayed by a minimum length using the optical delay element DE. The minimum length includes at least the switching time required for evaluating the preceding first route signal LS1 as described below and the switching time required for switching through a route LW as described below.

The first subsidiary data stream DS12 is transmitted to the synchronization unit SYNC. That is, the first data packet DP1, including the preceding and succeeding first and second route signals LS1, LS2, is transmitted to the synchronization unit SYNC. The synchronization unit SYNC uses the first route signal's LS1 modulated carrier signal cs for clock synchronization. More specifically, the frequency of the carrier signal cs (which is preferably matched to the data transmission rate) allows the carrier signal cs to be used for clock regeneration. The synchronization unit SYNC uses the carrier signal cs to obtain clock information ti and transmit it to the central processor unit CPU.

The synchronization unit SYNC also transmits the first data packet DP1, including the preceding and succeeding first and second route signals LS1, LS2, to the evaluation unit EVU. The evaluation unit EVU detects the preceding first route signal LS1. The first route signal LS1 is then processed by the central processor unit CPU. More specifically in this embodiment, the first frequency mix FG1 that was used to modulate the carrier signal cs is detected. Additionally, the first route information li1 that was recovered using the first frequency mix FG1 is converted to a control signal ss for controlling the switching unit SWU for the purpose of automatically routing the first data packet DP1. Using the control signal ss, the switching unit SWU first selects a specified channel for the connection (e.g., one of the optical fibers, such as, for example, the optical fiber OV2). The switching unit SWU then receives the first data packet DP1, including the preceding and succeeding first and second route signals LS1, LS2, from the optical delay element DE after the optical delay element DE has suitably delayed the first main data stream DS11 as described above, and switches it through to the selected channel. As shown by a dotted line in FIG. 3, for example, the first data packet DP1, including the preceding and succeeding first and second route signals LS1, LS2, is forwarded to the third item OTE3 through route LW and the second optical connecting fiber OV2. The control signal ss remains unchanged until the evaluation unit EVU detects the second route signal LS2, which represents the end of the transmission of the first data packet DP1 (or, for example, the end of the transmission of the last data packet DP of a plurality of data packets DP in a connection). Once the second route signal LS2 has been detected, transmission of the control signal ss to the switching unit SWU is terminated. After the first and second route signals LS1, LS2 have been successfully evaluated by the evaluation unit EVU, the evaluation unit EVU, for example, discards the first data packet DP1 (or, for example, the plurality of data packets DP) and the first and second route signals LS1, LS2.

In FIG. 3, a dotted line is used to show the route LW switched through in the switching unit SWU for the first data packet DP1. In the illustrative embodiment shown, the first data packet DP1, including the preceding and succeeding first and second route signals LS1, LS2, is forwarded to the third item of optical transmission equipment OTE in a second optical connecting fiber OV2.

If a plurality of data packets DP in a connection are transmitted in the first data stream DS1 in succession to one another, the first route signal LS1 is placed in front of the first data packet DP1 in the plurality of data packets DP and the second route signal LS2 is placed after the last data packet DP in the plurality of data packets DP. The control signal ss remains unchanged throughout the time required for the transmission of the plurality of data packets DP, and all the data packets DP in the plurality of data packets DP are accordingly switched to the same channel by the switching unit SWU.

The switching unit SWU may include, for example, optical splitters having polarization beam splitters, electrically switchable polarization rotators and polarization filters and, as appropriate, optical amplifiers. Alternately or additionally, the switching unit SWU may include optical splitters and associated semiconductor amplifiers.

It should be noted that the invention is not limited for use with WDM transmission systems, but rather can alternately or additionally be used for the automatic routing of data packets DP in any desired packet-oriented optical transmission systems.

What is claimed is:

1. A method for the automatic routing of data packets in an optical data packet stream that are each separated by a time interval including no data, comprising:
    converting route information to allocated frequency mixes at the transmitter end producing a mix of frequencies for a respective frequency mix allocated to a particular route signal that represents the route information;
    producing route signals by modulating a carrier signal with the frequency mixes, wherein a carrier frequency selected for the route signals is a substantially lower data transmission rate;
    placing at least one of the route signals produced in front of and after at least one data packet;
    transmitting the data packet including the route signals;
    evaluating at the receiver end, the route signals in terms of the frequency mixes used for the modulation; and
    switching the data packet using the route information obtained from the frequency mixes.

2. A method for the automatic routing of data packets in an optical data packet stream that are each separated by a time interval including no data, comprising:

converting route information to allocated frequency mixes at the transmitter end producing a mix of frequencies for a respective frequency mix allocated to a particular route signal that represents the route information;

producing route signals by modulating a carrier signal with the frequency mixes, wherein a carrier frequency selected for the route signals is a substantially lower data transmission rate;

placing at least one of the route signals produced in front of or after at least one data packet;

transmitting the data packet including the route signals;

evaluating at the receiver end, the route signals in terms of the frequency mixes used for the modulation; and switching the data packet using the route information obtained from the frequency mixes.

3. The method as claimed in claim 2, wherein the route information is converted to the route signals by amplitude modulation of the carrier signal with the frequency mixes.

4. The method as claimed in claim 2, wherein the route information is converted to the route signals by phase modulation of the carrier signal with the frequency mixes.

5. The method as claimed in claim 2, wherein:
a carrier frequency selected for the route signals is one of a data transmission rate and half the data transmission rate, and
audio-frequency modulation frequencies are used for modulating the route signals.

6. The method as claimed in claim 2, wherein a connection is terminated using one of the route signals, said one of the route signals succeeding the data packet.

7. An optical transmission system having automatic routing for data packets that are each separated by a time interval including no data, comprising:
a transmission unit and a reception unit;
a conversion unit at the transmitter end for converting route information for at least one data packet to route signals produced by modulating a carrier signal with a frequency mix producing a mix of frequencies for a respective frequency mix allocated to a particular route signal that represents the route information and for adding the route signals at least one of in front of and after the data packet, wherein a carrier frequency selected for the route signals is a substantially lower data transmission rate;
a transmission device for transmitting the data packet, including the route signals;
an evaluation unit, at the receiver end, for detecting and evaluating the route signals; and
a switching unit for switching through the data packet using the route information ascertained by evaluating the route signals.

8. An optical transmission system having automatic routing for data packets that are each separated by a time interval including no data, comprising:
a transmission unit and a reception unit;
a conversion unit at the transmitter end for converting route information for at least one data packet to route signals produced by modulating a carrier signal with a frequency mix producing a mix of frequencies for a respective frequency mix allocated to a particular route signal that represents the route information, and for adding the route signals at least one of in front of or after the data packet, wherein a carrier frequency selected for the route is a substantially lower data transmission rate;
a transmission device for transmitting the data packet, including the route signals;
an evaluation unit, at the receiver end, for detecting and evaluating the route signals; and
a switching unit for switching through the data packet using the route information ascertained by evaluating the route signals.

9. The optical transmission system as claimed in claim 8, further comprising a synchronization unit that uses the carrier signal of one of the route signals, said one of the route signals preceding the data packet, for clock synchronization.

10. The optical transmission system as claimed in claim 8, further comprising an optical splitter at the receiver end for isolating part of a data packet stream, said part being forwarded to the evaluation unit.

11. The optical transmission system as claimed in claim 8, further comprising an optical delay element, at the receiver end, for delaying the data packet stream by a minimum length, said minimum length comprising a switching time required for evaluating a preceding one of the route signals and a switching time required for switching through a route.

12. The optical transmission system as claimed in claim 11, wherein the optical delay element is arranged between an optical splitter and the switching unit.

* * * * *